Feb. 1, 1966     C. T. M. VON JAEGER     3,233,013
PROCESS FOR FORMING SHAPED ARTICLES FROM CELLULOSIC
MATERIAL BONDED BY A THERMOSETTING RESIN
Filed Aug. 13, 1962     4 Sheets-Sheet 1

INVENTOR.
CLAYTON T.M. VON JAEGER
BY
     Paul M. Phillips
         ATTORNEY

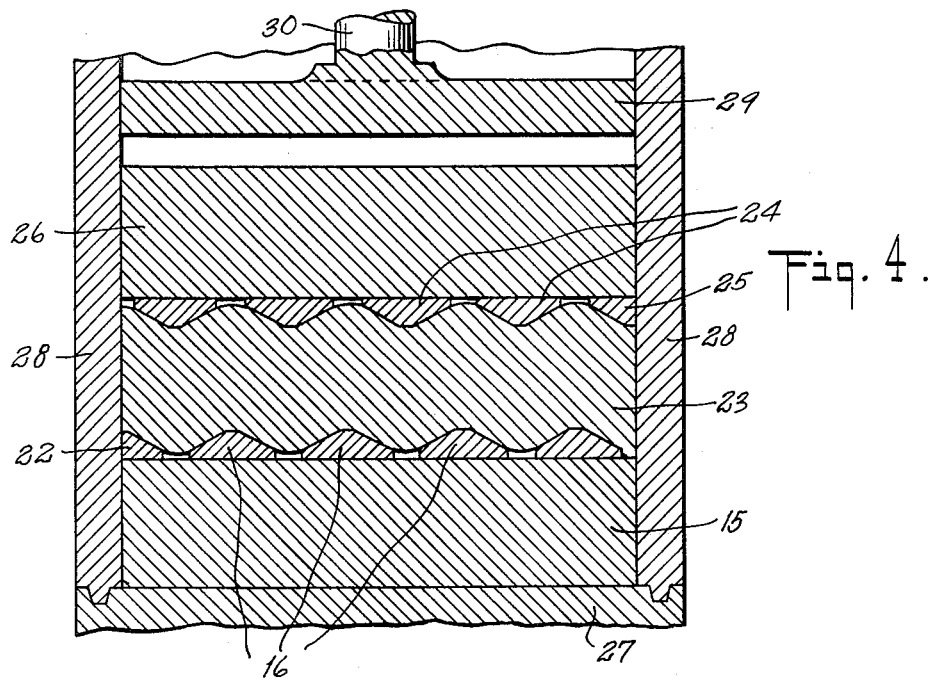
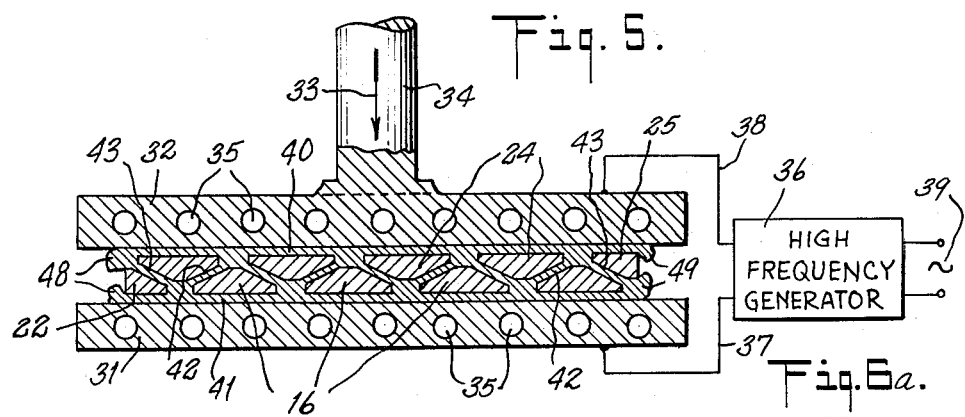
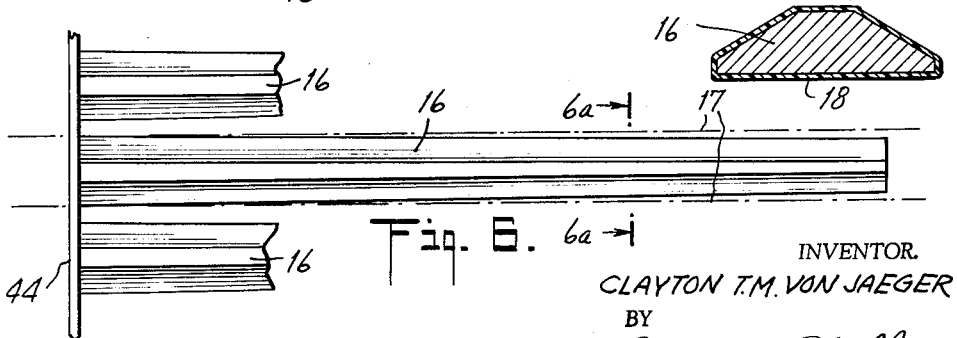

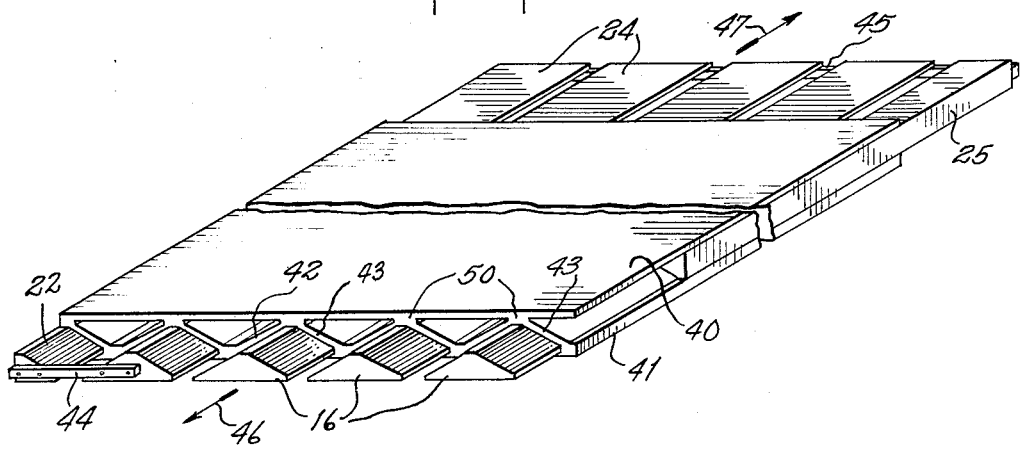
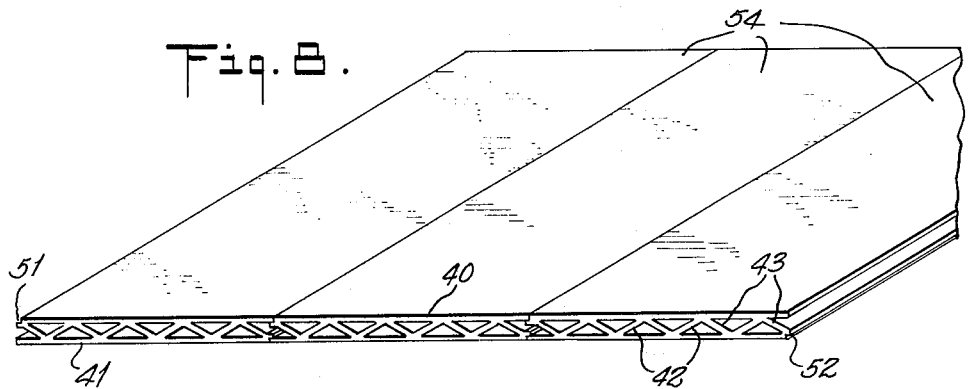
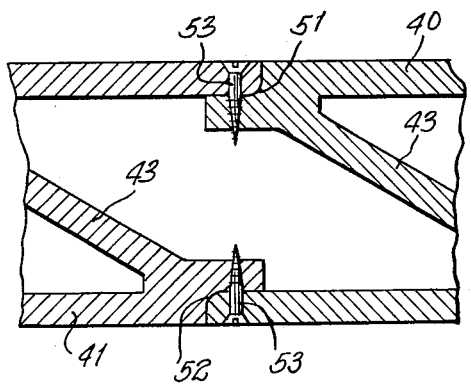
INVENTOR.
CLAYTON T.M. VON JAEGER
BY
ATTORNEY

INVENTOR.
CLAYTON T.M. VON JAEGER
BY
*Paul M. Phillips*
ATTORNEY

United States Patent Office 3,233,013
Patented Feb. 1, 1966

3,233,013
PROCESS FOR FORMING SHAPED ARTICLES FROM CELLULOSIC MATERIAL BONDED BY A THERMOSETTING RESIN
Clayton T. M. von Jaeger, New York, N.Y. (Fajardo, Puerto Rico 00649)
Filed Aug. 13, 1962, Ser. No. 216,572
6 Claims. (Cl. 264—26)

The present invention relates to a process for forming shaped articles from cellulosic material bonded by a thermosetting resin. More particularly, the present invention provides a process for subjecting a mixture of cellulosic material and resin to heat and pressure in such manner as to form articles, wherein at least one core element or the like is used which is not a part of the finished article and where some of the heat used for curing the resin is supplied by the application of dielectric means using electrical energy applied solely to a pair of platens which are uniformly spaced apart.

It is recognized that cellulosic materials, including not only wood chips, wood fiber, wood flour and also cellulosic plant bodies, including bagasse, have heretofore been bonded together into board form by the use of thermosetting resins, which are mixed in an uncured state with the cellulosic material and the mixture then subjected to heat and pressure. It is further recognized that the heat required for curing the resin in some instances has been supplied by the use of dielectric energy in making articles of this kind.

In the making of certain of such articles, however, for example, building wall panels, the center portions of the panels are desired to be cored out, so as to provide a hollow webbed structure for the cross-section of each panel with holes extending therethrough in one direction and in a more or less parallel manner. When making such a construction, it has been customary in the past, when curing the resin with dielectric heat, to provide core members of metal or the like and to apply some of the high frequency electrical energy by using the core members per se as electrodes. This has been necessary in order that the heating of the several transverse webs of the article be substantially uniformly cured, rather than overheating one part and not giving sufficient heat to some other part.

The present invention provides an arrangement by which all these difficulties are overcome and a very simple pressing device used, with dielectric energy (high frequency currents) supplied to the platens only, for making an article using one or more cores. In such an apparatus, the dielectric heat may be applied uniformly throughout the body of the article, so that exactly the right curing can be obtained without wasting heat or the energy required to provide it and without undesired overcuring of portions of the articles. This is attained by forming the one or more cores themselves of a material which has substantially the same dielectric constant as the cured material of the article being formed. In the present instance, it is found that the core material may be wood of any suitable kind which is otherwise adapted for use as cores and which will stand up under the heat and pressure conditions to which it is subjected. Many types of hard wood such as ash, oak and the like are usable for this purpose.

It is also necessary in many instances to facilitate the removal of the cores following the making of an article. For this purpose the surface of the cores may be treated with any suitable material capable of reducing the frictional engagement between the cores and the material of the completed article. A preferred material, however, in accordance with the present invention has been found to be a layer of tetrafluoroethylene (which is sold commercially under the trademark name "Teflon"). It is found that this material is capable not only of withstanding the heat and pressure which is used, but also has such a low coefficient of friction when in contact with the material of the finished article that it is advantageously used for this purpose.

The present invention further comprises the provision of a method by which several mats may be supplied with one or more cores therebetween and with certain of the cores removable in one direction and the others in the opposite direction. In a preferred form, a stack may be built up as follows: first, a mat of the mixture as aforesaid, then a row of cores each as aforesaid and laid with their longer axes parallel and their tapers preferably all in one direction; then a second layer or mat of the mixed cellulosic material and resin; then a second layer of parallel cores of the same kind, but with their tapers all in the opposite direction than those of the first layer, with the cores of this second layer offset laterally so as to be about midway between the cores of the first layer, so as to provide for the formation of an article having zig-zag webs connecting two surface layers of body portions; and finally, a third layer or mat of the cellulosic material and resin.

This stack may, if desired, be subjected to a pre-pressing, which will give a partial mechanical compacting of the stack aforesaid so as to reduce it, for example, from a thickness of perhaps 60 inches to one of one-half that thickness or less. This facilitates the final pressing and curing of the article and provides for the use of a final press apparatus wherein the platens can be a relatively less distance apart at the outset.

The invention further contemplates the arrangement, as to process, in which one or more of the cores are disposed between one or both the platens of the press and a part of the mixed cellulosic and resin material used to form the final articles.

The invention further contemplates the making of articles, such as mating mold sections, wherein one or more cavities are formed by the use of cores constructed in accordance with the present invention and wherein the remainder of the material forming the two mating sections is separated by a sheet of suitable material, such as tetrafluoroethylene.

Other features and advantages of the present invention will become apparent in consideration of the following description of certain preferred embodiments thereof, all when considered in conjunction with the accompanying drawings in which:

FIG. 4 is a fragmentary and somewhat diagrammatic view substantially in vertical section showing a stack made up of three superposed mats with rows of cores between the several mats positioned in a pre-pressing device in which preliminary mechanical compacting pressure may be applied to the stack;

FIG. 5 is a similar fragmentary view, substantially in vertical section, illustrating the platens only of a press and the mode of application thereto of high frequency electric current or dielectric energy for applying heat and pressure for curing an article made with a plurality of cores therein such as may be made by the steps illustrated in FIGS. 1–4;

FIG. 6 is a fragmentary view principally in plan of a parallel series of cores in the general arrangement in which they are disposed in FIG. 2 showing the tapering forms of the cores and a common means (diagrammatic) by which they may be withdrawn from the completed article;

FIG. 6a is a view in transverse section on the line 6a—6a of FIG. 6 illustrating the core construction and the manner in which the cores are covered by a suitable anti-friction material;

FIG. 7 is a view of a completed article as formed by the device of FIG. 5 and from which the cores are partially withdrawn, the view being in perspective;

FIG. 8 is a view in perspective of a plurality of structural boards, each formed in accordance with the present invention, showing the manner in which they can be interfitted together in a wall or floor construction;

FIG. 9 is an enlarged fragmentary view principally in vertical section showing in detail a manner of cutting adjacent edges of two boards, each formed in accordance with the present invention, and securing them together at a joint;

Figure 12:
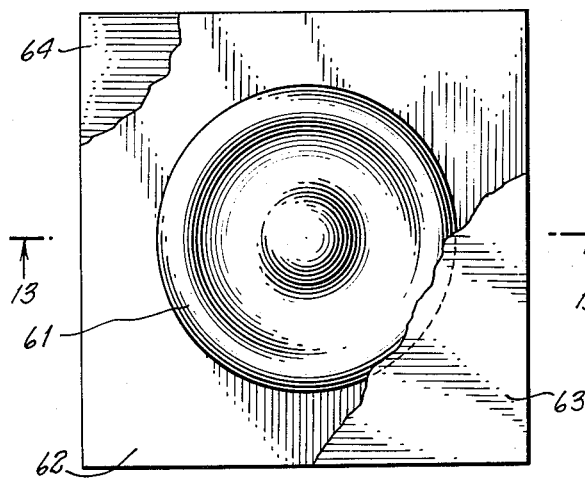
Figure 13:
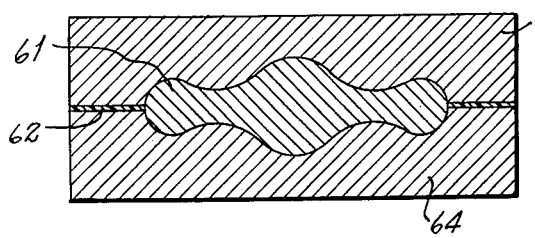

FIG. 12 is a view substantially in plan of another embodiment of the invention in which the parts being formed are in effect a pair of mating mold sections, which are formed around a central core, and are separated from one another during the formation by means hereinafter described; and FIG. 13 is a view substantially in transverse section on the line 13—13 of FIG. 12 showing the elements of the present invention in the position they occupy following the completion of the formation of the article and the curing of the resin bond therein and prior to the separation thereof for the removal of the core and other separating means between the mating portions of the article.

The present invention is applicable to the making of articles of the general type of wall board or other synthetic board material, which are made from cellulosic and sometimes ligno-cellulosic materials, such as wood in some relatively divided form, as wood chips, wood flour, wood fibers, or the like, and is also applicable to the use of other cellulosic materials such as bagasse (a sugar cane material remaining following the squeezing and/or leaching out of the sugar contained therein as the canes are originally harvested). Bagasse is the presently preferred material. This material when dry is largely a waste product, although some uses have heretofore been found for it. In any event the cellulosic material is bound together with a thermosetting resin. Almost any known thermosetting resin can be used, including the well-known phenolformaldehyde type resins; although the preferred resin in accordance with the present invention is a melamine-urea type resin. The resin in some uncured state is intimately mixed with the cellulosic material to form a substantially homogeneous mixture, the mixing being done in any suitable manner and by the use of any suitable and desired equipment, all of which forms per se no part of the present invention.

Figure 1:
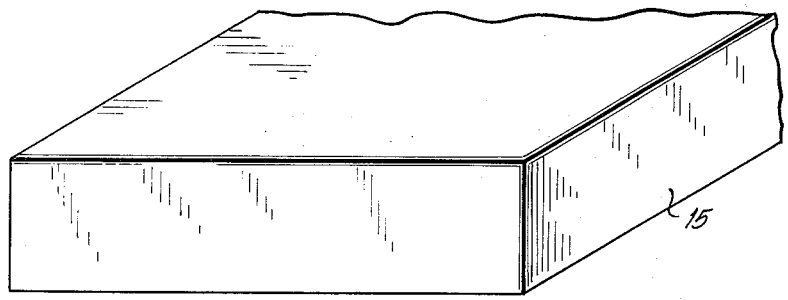
FIG. 1 is a diagrammatic view in perspective of a mat formed of cellulosic material mixed with a thermosetting resin as a substantially homogeneous mixture or mass and in readiness for use in the present invention.

This mixture of materials is preferably formed into mats, again by any suitable means which per se form no part of the present invention, but wherein the mats have a desired thickness in accordance with the particular article to be formed, the mats being either wholly uncompacted or semi-compacted, as may be desired. In any event, one of the mats of this material in a condition which is at least partially uncompacted is shown in FIG. 1 at 15.

In FIGS. 1–6 of the accompanying drawings a process is illustrated forming hollow building wall members of a type including a pair of heavy sheet-like surface portions separated from one another and interconnected by intervening substantially integral webs which appear zigzag in a cross-section of the completed wall member as seen in FIGS. 5, 7 and 8. In the making of such a structure, which is a principal embodiment of the present invention, it is necessary to use a plurality of core members.

In the past, as hereinabove generally referred to, when this type structure was being made and when the heat for curing the resin was applied as dielectric heat by subjecting the body to dielectric or high frequency energy, it was usual to use the cores themselves as electrodes; as otherwise it was considered practically impossible to obtain a uniform application of heat and pressure to the webs as well as to the side panel portions of the desired article. The present invention, however, overcomes this difficulty by providing particular type core members, specifically, those having dielectric constants approximating that of cured material in the final article after it has been pressed and the resin bond therein cured to its final state.

It has been found in accordance with this invention that if cores or core members are used which have approximately the same dielectric constant as the material of the final article, the high frequency energy can be applied solely between the platens of a press wherein the platens are a uniform distance apart throughout their area and in the usual case, as shown in FIG. 5, wherein they are both planiform as to their surfaces engaging the material therebetween. Under these circumstances the application of dielectric energy will generate heat to the same extent in the cores as in the webs of the final article therebetween, and therefore there will be a uniform application of heat throughout all parts of the body.

The cores for this purpose are preferably formed of wood. Almost any kind of wood can be used so long as it is sufficiently hard and resistant to the action of moisture that it will not be affected by the conditions of use. In this respect it is recognized that the cores will be exposed to the material being formed during curing of the resin, and that during this time the cores will be raised to a temperature substantially above room temperature and generally in the order of 300°–400° F., more or less, depending upon the type of resin being used. In addition, the cores are exposed to the material being formed at a time when moisture is being evolved; as the curing action of the resin in many instances at least results in the emission of moisture (for example, water is a reaction product in the case of the curing of phenolformaldehyde resin and similarly in the case of many other thermosetting materials). In addition, the cellulosic material being used in accordance with this invention has a definite moisture content; and as it is subjected to the formation process, this moisture also can affect the core material.

It is preferred, therefore, that the wood used shall be one having a moisture content which is slightly less than that of the fibers which are used in the mixture being worked; and further, that the wood shall have no knots of a resinous nature or other high resin content which could create gases during the curing process. It is found, for example, that many of the commercially available hard woods, such as oak, ash and the like, are applicable for the present purposes. These examples are given not by way of limitation, but solely as illustrative of material usable in accordance with this invention.

It is also practically necessary in accordance with the present invention that means be provided for enabling the removal of the cores following the completion of the formation of the articles. For this purpose the cores are preferably tapered as shown in FIG. 6 by a comparison of the full line showing of a core 16 and the parallel dotted lines 17. It will be understood that the height as well as the width of the cores may be similarly tapered from one end to the other, i.e. from left to right as seen in FIG. 6, so that once each core has been loosened from the article following the completion of the formation thereof, for example, by one or more sharp blows, vibration or the like, each core may be withdrawn therefrom in the direction of its larger end.

It is also practically necessary that some antifriction material be used between the wooden core members and the material of the article being formed. Any suitable material could be used for this purpose, but it is found in accordance with the present invention that polymerized tetrafluoroethylene (a material commercially available under the trademark name "Teflon"), is admirably suited for this purpose. Thus, as shown in FIG. 6a, each of the cores is preferably surrounded by a relatively thin film or layer 18 of this material.

Figure 2:
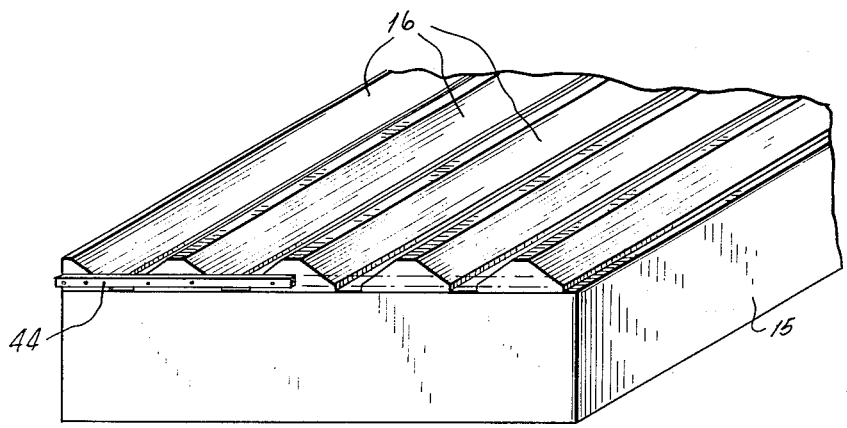
FIG. 2 shows a series of core members according to the present invention arranged with their longer axes parallel and all on top of a mat as seen in FIG. 1, the view being similarly in perspective.
Figure 3:
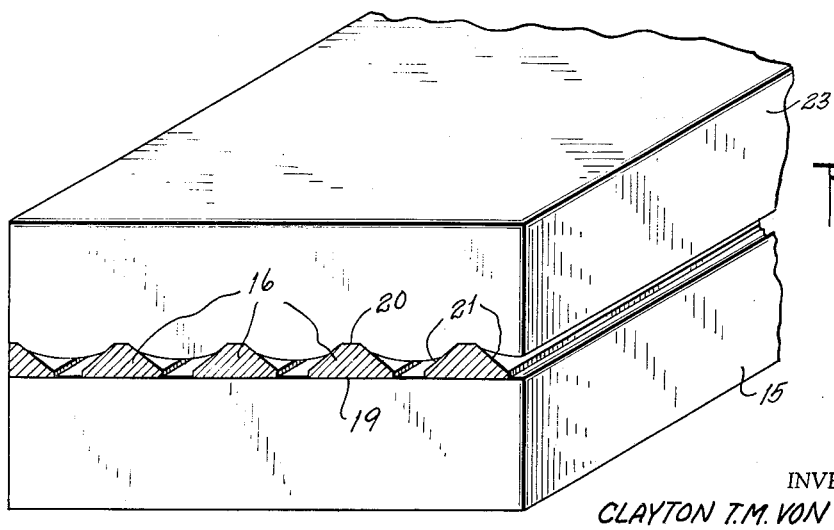
FIG. 3 is a similar view showing a second mat similar to the first and placed on top of the row of cores of FIG. 2.

When using the type cores as aforesaid in the process illustrated in FIGS. 1-5 above, the mat 15 has disposed thereon a series of cores 16, which are arranged with their longer axes parallel and with their larger ends downward and to the left as seen in FIGS. 2 and 3 and toward the viewer as seen in FIG. 4. These cores 16 are formed as shown in cross-section in FIG. 3 with wider bases 19, relatively narrow top portions 20 and long sloping sides 21; and, except that the sides do not meet the bottom 19 at a knife edge, might be considered as in the form of a truncated triangle in cross-section. The cores 16 as shown in FIGS. 2, 3 and 4 may be considered as one group of cores. At the edges of the article being formed it may be necessary to use part cores as shown at 22, FIGS. 4 and 5, in order that the general pattern of the cores shall be uniform, i.e. that there shall be uniform distance between the centers of all the cores in a direction lateral thereof.

Superposed above the group of cores 16 is preferably a second mat 23 which may be similar in construction and dimensions to the first mat 15 and which, as originally applied as shown in FIG. 3, tends to sink down to some extent into the spaces between the cores 16.

There is next applied a second group of cores here shown at 24 including a part core 25, each core of which is preferably constructed in the same manner as the core 16, but here all are arranged with their larger ends opposite those of the group of cores 16, i.e. the taper is in the opposite direction. Furthermore, they are laterally offset with respect to the cores 16 of the first group, so that the centers of the cores 24 will be vertically above points midway between the centers of the cores 16 in a lateral direction.

Above the second or upper group of cores 24 is preferably superposed a third mat 26 forming a stack as shown in FIG. 4 which is of substantial thickness prior to some compacting of the material. For example, it is contemplated that a thickness of as much as 60 inches or even more may be used in the forming of a board which is eventually only four or five inches in overall thickness.

The stack of cores and mats shown in FIG. 4 is preferably but not necessarily subjected to a pre-pressing, for example, in a device including a bottom 27 and side guards 28 and end guards (not shown). The device is also provided with a pressing plunger 29 carried by a shaft 30 capable of exerting a sufficient pressure to compress the stack to a fraction of its original thickness. Inasmuch as the thickness resulting from pre-pressing is not at all critical and as the pre-pressing is only for convenience in any case (the entire fabrication operation could take place in the final press), no detailed showing is given herein of the result of the pre-pressing operation.

Suffice it to say that the original or the pre-pressed stack is transferred in any suitable way to the final press, which is shown diagrammatically in FIG. 5 and includes a lower platen 31 and an upper platen 32. The remainder of the device is not illustrated, as it is believed that the diagrammatic showing herein given is sufficient to explain to those skilled in the art the construction and mode of operation of the device.

It will be understood that the platens 31 and 32 may be mounted in a conventional manner, i.e. the platen 31 is preferably suitably mounted on an appropriate base (not shown) usually in a stationary position and appropriate means are provided for supplying mechanical pressure to move the platen 32 downwardly as shown by the arrow 33 applied on a plunger member 34 by which the platen 32 may be moved in a vertical direction. Suitable means (not shown), usually hydraulic in nature, may be employed for moving the platen 32 in the manner shown and for moving it upwardly following the completion of the formation of an article.

In this embodiment of the invention and in the making of many other articles wherein one or both the platens come into direct contact with the mixture of cellulosic material and resin to be molded, it is usually necessary to supply surface heat to the material being molded from the platens in order that these portions of the article shall not be at a lower temperature than other portions thereof. For this purpose, means are preferably provided for supplying heat to the platens, such means in the present instance comprising a plurality of cored portions or holes 35 through which a suitable heated fluid may be passed or which may be supplied with electric heating means (not shown) of a resistance type, both expedients for supplying heat being known in the art. The purpose in any event is to supply heat to the platens to maintain their surfaces, which are in contact with the material forming the mats 15 and 26, at approximately the same temperature as that material. That is to say, the platens should not be much colder than the material, or they will absorb some of the dielectrically supplied heat. Also, the platens should not be much hotter, or the material will have it surfaces overcured. If the heating cycle is properly designed, the heat in the platens will contribute very little to the curing of the board which will be accomplished principally by the dielectric effect between the platens acting as electrodes. It has been found that a platen temperature 10° F. lower than the temperature to be induced dielectrically results in a good board surface, but this may be varied according to the individual circumstances. In any case, the platen temperature should not be substantially (not more than 10%) different than the dielectric temperature.

In addition, and as a principal means for supplying heat in accordance with the present invention, the platens are supplied with high frequency electric current for the generation of dielectric heat within the body of the article itself. For this purpose the platens 31 and 32 are connected to a high frequency generator shown diagrammatically at 36 by conductors 37 and 38 respectively. The high frequency generator 36 may be supplied with electric energy from any suitable supply thereof indicated at 39. It is noted that in accordance with the present invention the platens 31 and 32 are the only electrodes used in the process to which dielectric energy is supplied, the cores 16, 22, 24 and 25 all being of wood as aforesaid and thus not being usable as electrodes.

However, in view of the fact that the cores all have substantially the same dielectric constant as the final body of the article being formed, once the material to form the article is compressed substantially as shown in FIG. 5 by the application of mechanical pressure, the resistance to the flow of high frequency or dielectric energy is substantially constant throughout the area of the articles, i.e. is the same whether the energy passes through portions of the final article, or portions of the cores, or both. As a result, it is possible in accordance with this invention to provide for the uniform generation of heat and hence the uniform heating of the material of the final article at all portions thereof and, therefore, to obtain uniform curing of the resin throughout. Thus, both the side portions of the final article shown at 40 and 41 respectively and the webs shown at 42, 43 extending between the side portions are all subjected to the same conditions of heat and pressure and hence will be cured to give an article having all portions substantially uniform in character as to density, character of curing of the resin, etc. The resulting article will be substantially integral and substantially homogeneous throughout.

The next step in the production of an article following its removal from between the platens 31 and 32, or possibly after only the pressure on the platen 32 is relieved, is to remove the cores from the article. It is contemplated that the cores may be jarred loose from their initial positions during the forming of an article by one or more sharp taps thereon or possibly by the application of mechanical vibration thereto in any suitable way known to the art. In any event, following this they are preferably moved out of the article in groups, the cores 16 and 22 of the lower group being secured together, for example, by suitable means indicated diagrammatically in FIGS. 2 and 7 at 44. Similarly, the cores 24 and 25 of the upper group may be secured together by an appropriate means indicated diagrammatically in FIG. 7 at 45. The two groups of cores are then moved in the direction of the arrows 46 and 47 respectively, i.e. so as to take advantage of their tapers as aforesaid.

Inasmuch as the final pressing platens 31 and 32 are not provided with lateral confining members or means as shown, some of the material from the mats will be squeezed laterally to form irregular edge portions at 48 and 49 as seen in FIG. 5. This irregular material is later sheared off in a suitable manner and the edges preferably formed as shown best in FIG. 9, wherein one of the thickened web portions shown at 50 in FIG. 7 is rabbeted as shown at 51 at one surface on one edge of a side panel portion as on the left of the panel 40 as seen in FIG. 9; while a corresponding edge of the opposite panel portion 41 is similarly rabbeted as shown at 52 on the opposite edge. This enables the interlocking of the remaining edge portions as particularly shown in FIG. 9 and permits these interlocking portions of two sections to be secured together by any suitable means such as wood screws 53 or the like. A wall made up of a plurality of the finished sections each generally indicated at 54 is shown in FIG. 8.

Figure 10:
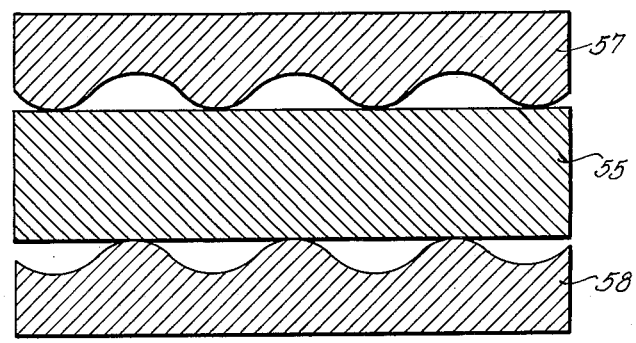
FIG. 10 is a diagrammatic view in transverse section illustrating a mat for the forming of a board having a sinuous or wavy form, the form being imparted by a pair of core members respectively located between the mat and the platens of a press such as that shown in FIG. 5.
Figure 11:
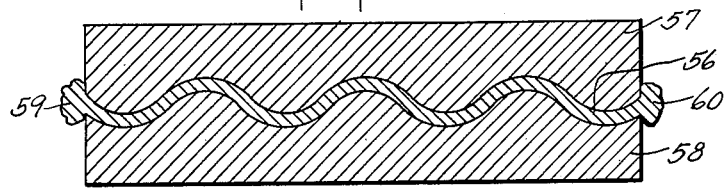
FIG. 11 is a view similar to FIG. 10 of the parts shown in that figure at the substantial completion of the pressing and curing operations.

Turning now to the form of the invention shown in FIGS. 10 and 11, there is illustrated in FIGS. 10 a mat 55 which may be of the same composition or construction as that shown in FIG. 1 at 15 and may, if desired, be partially pre-pressed as above generally described. The purpose in this embodiment of the invention is to make a wavy or corrugated sheet as seen in cross-section for the sheet 56 in FIG. 11. This may be done employing the present invention by interposing a pair of formed core-like members 57 and 58 between the mat 55 and the platens of the press, which are not shown in these two figures, but which, it may be understood, may be the same as shown at 31 and 32 in FIG. 5. Here the forms or core members are interposed respectively between the body to be formed and the press platens.

As a possible modification of the form shown in FIG. 10, it will be obvious to those skilled in the art that only one core-like member need be interposed between a part or all of the material to be formed and one only of the press platens, the remainder of the material to be formed contacting the other or both of the platens. It is further contemplated that the one or more core members so used may not occupy the entire area of the press platen or platens, but only so much as is desired thereof in order to make the article to be formed of a desired shape. All these expedients are usable with mold members constructed as aforesaid for forming specially shaped articles.

As shown in FIG. 11, some of the material of the original mat 55 may be squeezed out of one or both edges as shown at 59 and 60, FIG. 11. This portion may be sheared or otherwise cut off in a desired manner following the completion of the formation of the desired article. Furthermore, the edges of the article as finally trimmed and finished may be so arranged as to have an overlapping relation with one another in a manner similar to that shown in FIG. 9, all without departing from the present invention.

In FIGS. 12 and 13 is shown a still further embodiment of the present invention. In these figures there is illustrated schematically the formation of bodies which may be shaped to correspond to mold halves, in that they are provided with mating cavity portions, which may be the same or different in contour and internal configuration, but which have generally the same outside shape at the surface where the two portions are separated from one another. This may be in a plane as shown or may be in some other arrangement as is common in the making of part molds.

As shown in these figures, a pair of mats, each as shown in FIG. 1 at 15 or in FIG. 10 at 55, may be employed and either pre-pressed or not as desired and then inserted into the space between press platens which may be constructed and operated as shown and described with respect to FIG. 5. Between these two mats, of the same or similar material as aforesaid, is preliminarily introduced at least one core member 61 (only one here shown). Also, in order that the upper and lower portions forming the final article may be separated from one another at portions not occupied by the one or more cores used (each as 61), for example, these other portions are separated by a sheet 62 of material which is preferably of some character that will not be damaged in use. While it is contemplated that various types of materials could be used in this way and for this purpose, including metals or the like, it is preferred in accordance with the present invention that a sheet of plastic material such as terafluoroethylene be used. The advantage of such a sheet that it may be easily and relatively quickly cut out to the shape of the core or cores 61 used in conjunction therewith, so that either could be used for the forming of a number of articles independent of the other; and further, that either could be discarded when and if it is damaged, without interferring with or discarding the other.

As shown in FIGS. 12 and 13, the final articles, and there is a pair of them as shown, are illustrated at 63 as to the upper of the mating pair and at 64 as to the lower thereof. It will further be obvious that while the core member 61 is shown with the same upper and lower configuration or shape, this is not necessary, as an upper and lower shape each in accordance with what is desired and each independent of the other, may be chosen as the shape for the core member in accordance with the shape desired for the final article. It will be further understood that while the articles 63 and 64 are in effect mold halves, they could be used for any desired purpose, including decorative purposes where their intaglio conformation is desired. The present invention is in no way restricted to the use for which the product articles are to be put.

While there are herein shown and described but a few embodiments of the invention, the principles thereof and many equivalents have been set out as the description has proceeded and the application of the principles to use with different embodiments has been described. Other equivalents or alternatives will occur to those skilled in the art from the foregoing disclosure. I do not wish to be limited, therefore, except by the scope of the appended claims, which are to be construed validly as broadly as the state of the art permits.

What is claimed is:

1. The process of producing a hollow board member having parallel opposite faces of large area and having long hollow passages therein, each within the thickness of the board and separated from said faces by body portions of the board, said process producing said board from cellulose fibrous material impregnated with and bound together by a cured thermosetting resin, wherein said board is formed in part by the use of removable elongated core members, respectively to produce said passages, during the final pressing and curing of the board, and said process comprising the steps of forming a plurality of thick, compressible, sheet-like mats each having laterally at least the aforesaid area of the final desired shaped of the board and each comprising a substantially homogeneous mixture of cellulosic fibrous material and at least one thermosetting resin which is in a substantially uncured state, establishing a stack consisting only of said mats in superposed relation and said elongated core members and having the core members disposed between superposed mats, between the spaced, parallel, upper and lower platens of a press, wherein said platens are disposed at a substantially constant distance apart throughout their areas for any given setting of said press, said establishment of said stack comprising placing a first mat to be in flatwise parallel relation to the lower platen, placing a plurality of the elongated core members at laterally spaced localities on the upper surface of said first mat, to form passages in the ultimate board, and placing a second mat in flatwise relation directly on said core members and said upper surface of the first mat, all of said elongated core members consisting of material which has a dielectric constant approximating that of the resin-impregnated material of the mats when said resin-impregnated material is compressed as hereinbelow recited, so that substantially uniform dielectric heating of all parts of the stack between the platens will occur, notwithstanding the presence of said core members, supplying heat to the platens to bring them to and hold them at an elevated temperature at least at portions where they come into contact with the lower and upper mats of said stack, moving said platens together to provide physical compacting pressure on the resin-impregnated material of mats in the stack to form a pressed body, and thereby compacting the stack to the aforesaid thickness desired for the board, including compacting said first and second mats to surround the said plurality of core members between them, supplying high frequency electric current solely to said platens for dielectric heating of the said stack to generate and maintain a resin-curing temperature within the compressed cellulose-resin mixture of the mats in the stack during the pressing and curing thereof, to produce an article wherein the resin is cured, and removing the aforesaid plurality of core members from the article constituted by the compressed and cured stack, to produce the desired board member having hollow passages therein.

2. The process in accordance with claim 1, in which each core member is formed of wood.

3. The process in accordance with claim 2, in which said cellulosic fibrous material consists essentially of bagasse fiber.

4. The process in accordance with claim 1, in which the aforesaid plurality of elongated core members are placed in parallel, spaced relation across the upper surface of the said first mat, distributively over said upper surface, and then are covered by the said second mat, for producing the ultimate board having a plurality of substantially parallel passages parallel to its faces.

5. The process in accordance with claim 4, in which the stack of mats and core members comprises at least three of the mats, said stack being formed and established between the platens in the following order: first, the aforesaid first mat; second, the aforesaid plurality of elongated core members in parallel, spaced relation; third, the aforesaid second mat; fourth, a second plurality of elongated core members in parallel, spaced relation; fifth, a third mat; the second plurality of core members being placed parallel to but laterally offset from the first plurality, so that when the stack is compressed by the platens the core members of the second plurality respectively lie between successive core members of the first plurality with the compressed second mat forming wall portions between all the core members; and after the aforesaid pressing and curing of the stack, removing all of the core members to produce a board having a combined row of mutually interposed parallel passages.

6. The process in accordance with claim 5, in which each of the core members of the first and second pluralities thereof is of substantially triangular shape in cross-section, said process including disposing the first plurality of core members with the apex of each triangular shape upward and disposing the second plurality of core members with the apex of each triangular shape downward, to produce a cured board having the passages in the aforesaid combined row separated by oblique walls successively alternating in direction.

References Cited by the Examiner

UNITED STATES PATENTS

| 1,575,388 | 3/1926 | Roberts | 156—245 XR |
| 2,271,066 | 1/1942 | Ehrenhaft | 264—109 |
| 2,498,513 | 2/1950 | Cuypers | 264—309 XR |
| 2,564,397 | 8/1951 | Duddy | 264—41 XR |
| 2,572,953 | 10/1951 | Saari | 18—16 |
| 2,620,513 | 12/1952 | Cryor et al. | 264—119 |
| 2,624,916 | 1/1953 | Persak | 18—47 XR |
| 2,707,801 | 5/1955 | Gard | 18—47 XR |
| 2,820,250 | 1/1958 | Stratton | 18—16 |
| 2,841,856 | 7/1958 | Gelbman. | |
| 2,891,284 | 6/1959 | Levin et al. | 264—26 |
| 2,956,307 | 10/1960 | Fahrni | 18—47.5 |
| 2,992,152 | 7/1961 | Chapman | 18—47.5 |
| 3,050,426 | 8/1962 | Stevens | 264—112 XR |

FOREIGN PATENTS

| 501,809 | 3/1951 | Belgium. |
| 766,844 | 7/1934 | France. |
| 956,185 | 1/1950 | France. |
| 86,039 | 4/1936 | Sweden. |
| 101,076 | 3/1941 | Sweden. |

ALEXANDER H. BRODMERKEL, *Primary Examiner.*

MORRIS LIEBMAN, ROBERT F. WHITE, *Examiners.*